No. 731,472. PATENTED JUNE 23, 1903.
L. J. LE PONTOIS.
ELECTRICALLY CONTROLLED SPEED CHANGING MECHANISM.
APPLICATION FILED SEPT. 19, 1902.
NO MODEL.
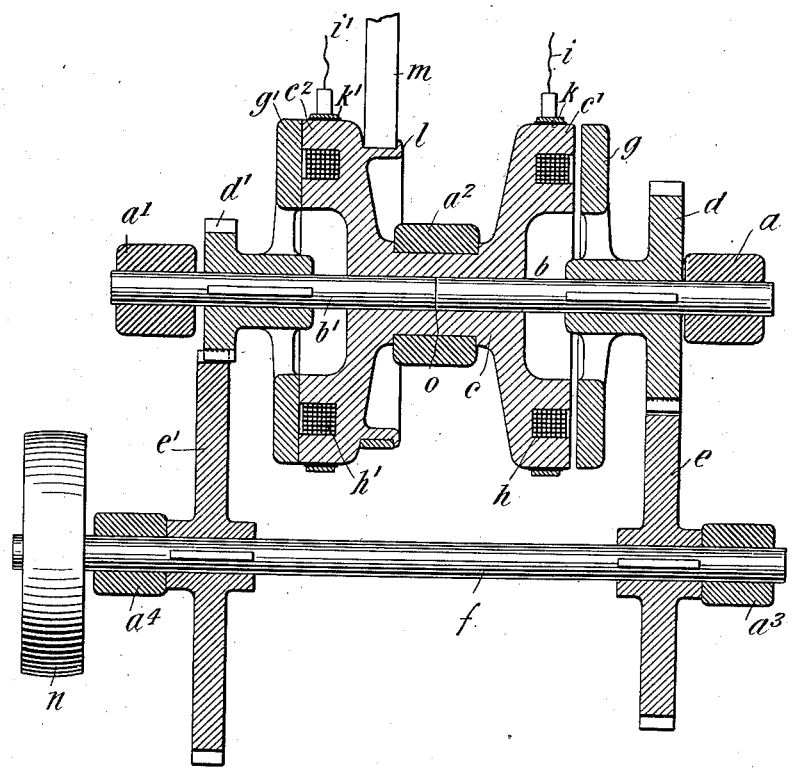
Witnesses:
Inventor No. 731,472.

Patented June 23, 1903.

UNITED STATES PATENT OFFICE.

LEON JULES LE PONTOIS, OF NEW YORK, N. Y.

ELECTRICALLY-CONTROLLED SPEED-CHANGING MECHANISM.

SPECIFICATION forming part of Letters Patent No. 731,472, dated June 23, 1903.

Application filed September 19, 1902. Serial No. 124,065. (No model.)

*To all whom it may concern:*

Be it known that I, LEON JULES LE PONTOIS, a citizen of the Republic of France, and a resident of New York city, State of New York, have invented certain new and useful Improvements in Electrically-Controlled Speed-Changing Mechanism, of which the following is a specification.

My invention relates to an improvement in electrically-controlled speed-changing mechanism whereby is provided a simple means for positively disengaging the electromagnetic clutch from the friction-disk when the current energizing the fields of the magnet has been cut off. It has proved in practice that where such means is not provided the residual magnetism in the electromagnetic clutch has a tendency to interfere with the proper operation of the apparatus.

In the following I have described, with reference to the accompanying drawing, a structure illustrating my invention, the features thereof being more fully pointed out hereinafter in the claims.

The drawing is a horizontal sectional view of the apparatus, showing the parts in operative position.

$a$, $a'$, $a^2$, $a^3$, and $a^4$ are bearings supported in any suitable manner. $a$ forms a bearing for the outer end of driving-shaft $b$, and $a'$ a bearing for the outer end of driving-shaft $b'$. The inner ends of shafts $b$ and $b'$ find a bearing in the double-pole annular electromagnetic clutch $c$, which turns loosely on the shafts and is itself supported by bearing $a^2$. Keyed to shaft $b$ is a pinion $d$, intermeshing with a pinion $e$, keyed on driven shaft $f$, resting in bearings $a^3$ and $a^4$. Keyed to pinion $d$ is a friction-disk $g$, adapted to coöperate with one pole $c'$ of the electromagnetic clutch $c$. Keyed to shaft $b'$ is a pinion $d'$, intermeshing with a pinion $e'$, keyed on driven shaft $f$. Keyed to pinion $d'$ is a friction-disk $g'$, adapted to coöperate with the other pole $c^2$ of the electromagnetic clutch. The field-magnets of the clutch are energized by means of annular coils $h\,h'$, respectively, receiving current from wires $i\,i'$ through suitable contact-rings $k\,k'$ and grounded. $l$ is a pulley keyed on the electromagnetic clutch $c$, receiving motion from a belt $m$ or other suitable means.

$n$ is a pulley for transmitting the motion of driven shaft $f$, as desired.

The driving-shafts $b$ and $b'$ are in alinement with each other, as shown, free to turn independently, their inner ends abutting at $o$. These shafts are free to move longitudinally in bearings $a\,a'$ and clutch $c$, respectively, the longitudinal movement being limited in one direction by the friction-disks coming into contact with the respective poles of the clutch and in the other direction by the pinions coming into contact with the bearings, the parts being so adjusted that the driving-pinions are not disengaged from the driven pinions.

It is obvious that if pole $c'$ of the clutch is magnetized friction-disk $g$ will be drawn into contact therewith, shaft $b$ pushing shaft $b'$ longitudinally, and consequently moving friction-disk $g'$ away from pole $c^2$. On the contrary, if current be cut off at $i$ and pole $c^2$ is magnetized friction-disk $g'$ will be drawn into contact therewith, shaft $b'$ pushing shaft $b$ longitudinally, and consequently moving friction-disk $g$ away from pole $c'$. The motion of pulley $l$ is accordingly transmitted through the clutch, turning in bearing $a^2$ and on shafts $b$ and $b'$, as shown, to the friction-disk in contact therewith and to the pinion driving the driven shaft.

I am aware that the form and arrangement of parts as shown and described may be changed without departing from the spirit of my invention, and I do not restrict myself to the details shown; but

What I claim, and desire to secure by Letters Patent, is—

1. In an apparatus of the character described, independently-operable driving-shafts adapted to impart longitudinal movement one to the other, and means for imparting such longitudinal movement.

2. In an apparatus of the character described, a longitudinally-movable driving-shaft, pinions keyed thereon, a driven shaft, pinions keyed thereon, and means for operating one set of pinions when the other is running idle.

3. In an apparatus of the character described, independently-operable driving-shafts in alinement with each other, an electromagnetic clutch riding loosely on said shafts, a pinion keyed to each of said shafts respectively and means for imparting a longitudinal movement to said shafts whereby one of said pinions is running idle while the other is transmitting motion.

4. In an apparatus of the character described, independently-operable driving-shafts in alinement with each other, an electromagnetic clutch riding loosely on said shafts, a pinion keyed to each of said shafts respectively, a friction-disk moving with each of said pinions and means for throwing one of said disks out of contact with the clutch while the other is in contact therewith.

In witness whereof I have signed my name in the presence of two subscribing witnesses.

LEON JULES LE PONTOIS.

Witnesses:
SEABURY C. MASTICK,
OTTO P. OSMERS.